(12) United States Patent
Brabender (10) Patent No.: US 10,838,393 B2
(45) Date of Patent: *Nov. 17, 2020

(54) CONFIGURABLE MAPPING OF TIMER CHANNELS TO PROTECTION GROUPS

(71) Applicant: RENESAS ELECTRONICS AMERICA INC., Milpitas, CA (US)

(72) Inventor: Jon Matthew Brabender, Cary, NC (US)

(73) Assignee: Renesas Electronics America Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/820,458

(22) Filed: Mar. 16, 2020

(65) Prior Publication Data

US 2020/0218229 A1 Jul. 9, 2020

Related U.S. Application Data

(63) Continuation of application No. 14/732,108, filed on Jun. 5, 2015, now Pat. No. 10,591,892.

(51) Int. Cl.
*G05B 19/414* (2006.01)
*G05B 19/406* (2006.01)

(52) U.S. Cl.
CPC ....... *G05B 19/406* (2013.01); *G05B 19/4142* (2013.01); *G05B 2219/33253* (2013.01)

(58) Field of Classification Search
CPC ...... G06F 11/3003; G06F 1/14; G06F 9/4825; G06F 11/3024; G06F 11/3041; G05B 19/406; G05B 2219/25278
See application file for complete search history.

(56) References Cited

U.S. PATENT DOCUMENTS

| | | | |
|---|---|---|---|
| 4,952,367 A | 8/1990 | Porter et al. | |
| 5,042,005 A | 8/1991 | Miller et al. | |
| 5,535,379 A | 7/1996 | Koura | |
| 5,925,115 A | 7/1999 | Ponte | |
| 6,631,483 B1 | 10/2003 | Parrish | |
| 6,845,419 B1 | 1/2005 | Moyer | |
| 6,952,749 B2 | 10/2005 | Kim | |
| 7,225,285 B1 | 5/2007 | Fairman et al. | |
| 2002/0143425 A1 | 10/2002 | Shimohara | |
| 2004/0108828 A1 | 6/2004 | Jung | |
| 2014/0173147 A1 | 6/2014 | Grafton et al. | |
| 2014/0304439 A1 | 10/2014 | Elahi et al. | |

*Primary Examiner* — Jaweed A Abbaszadeh
*Assistant Examiner* — Brian J Corcoran
(74) *Attorney, Agent, or Firm* — Foley & Lardner LLP (57) ABSTRACT

An apparatus and method for mapping timer channels to protection groups. One embodiment of the method can be implemented in a microcontroller unit (MCU) that comprises a central processing unit (CPU) coupled to a plurality of timer channels and a plurality of programmable group output disable (PTGOD) circuits. The CPU can select a first group of the timer channels to respond to an assertion of a first output disable signal from a first of the PTGOD circuits. Each timer channel of the first group can disable an output signal in response to receiving the assertion of the first output disable signal.

20 Claims, 7 Drawing Sheets

CONFIGURABLE MAPPING OF TIMER CHANNELS TO PROTECTION GROUPS

CROSS-REFERENCE TO RELATED APPLICATIONS

The present application is a continuation of U.S. patent application Ser. No. 14/732,108 filed Jun. 5, 2015, now U.S. Pat. No. 10,591,892, the contents of which are incorporated herein by reference in their entirety.

BACKGROUND

A microcontroller unit (MCU) is small computer formed on an integrated circuit. MCUs can generate signals for controlling of a wide range of devices, such as electric motors, voltage regulators, office machines, appliances, implantable medical devices, etc.

MCUs typically include a central processing unit (CPU), memory, and programmable peripherals components. The CPU executes a program (hereinafter referred to as an embedded program), which is typically stored in flash memory. MCUs may also include analog-to-digital converters (ADCs), digital-to-analog converters (DACs), comparators, timer/counter channels (hereinafter timer channels), etc. Timer channels are often used to autonomously control external devices such as induction motors. Because the timer channels operate autonomously, the CPU can perform other functions while timer channels control external devices.

SUMMARY

An apparatus and method for mapping timer channels to protection groups. One embodiment of the method can be implemented in a microcontroller unit (MCU) that includes a central processing unit (CPU) coupled to a plurality of timer channels and a plurality of programmable timer group output disable (PTGOD) units. The timer channels can generate output signals for controlling devices external to the MCU such as an induction motor. Each of the PTGOD units can assert a disable signal when, for example, a device external to the MCU asserts an error signal. The CPU can select the timer channels that will respond to an assertion of a first output disable signal from a first of the PTGOD units. Each of the selected timer channels will disable at least one of its output signals in response to the assertion of the first output disable signal.

BRIEF DESCRIPTION OF THE DRAWINGS

The present embodiments may be better understood in its numerous objects, features, and advantages made apparent to those skilled in the art by referencing the accompanying drawings.

The use of the same reference symbols in different drawings indicates similar or identical items

DETAILED DESCRIPTION

A typical MCU includes a CPU that executes or is configured to execute an embedded program. The CPU, while executing the program, can configure or program timer channels to autonomously control devices that are internal to the MCU or devices that are external to the MCU. The present embodiments will be described with reference to autonomous control of devices external to the MCU.

Timer channels are circuits that include one or more functional units such as compare/capture units, pulse-width modulation (PWM) units, etc. The terms units and circuits are used interchangeably. Not all timer channels of an MCU are identical. Some timer channels of an MCU may include only compare/capture units, while other timer channels of the MCU include only PWM units. Still other timer channels of the MCU may contain both compare/capture units, PWM units and other functional units.

Functional units of a timer channel, such as the compare/capture unit and the PWM unit, usually contain at least one n-bit counter register (hereinafter counter register), which stores and n-bit counter value (hereinafter counter value). Counter registers count pulses of a clock signal or pulses of an event signal. In other words, a counter register increments or decrements its counter value with each pulse of a clock signal or each pulse of an event signal. For most counter registers, the counter value overflows to zero after it reaches its maximum value.

Clock pulses are typically produced by a clock generator that is internal or external to the MCU. Scalar units in timer channels may adjust the frequency of the clock signal. Event pulses are generated by devices that are internal or external to the MCU. Event pulses are generated with corresponding events. For example, a comparator internal to an MCU may generate an event pulse at its output when the comparator detects equality between two input values. Or, an MCU may receive an event pulse generated by a magnetic sensor of an external device when the sensor detects a magnetic field of certain strength. For purposes of definition only, a pulse is an assertion (e.g., low voltage to high voltage) of a signal for a period of time. The period of time should be longer than that associated with an assertion of a signal caused by electrical noise.

A compare/capture unit of a timer channel contains at least one counter register that counts pulses when the compare/capture unit is started. Compare/capture units include one or more capture registers. When a capture signal is asserted, the counter value is copied to the capture register, thus creating a point-in-time copy of the counter value, which can be subsequently transmitted to and processed by the CPU. Compare/capture units may include one or more compare registers. A compare register can store a value generated by the CPU. This value can be continuously compared with the counter value. When the values compare equally, the compare/capture unit may assert an output signal, which can be subsequently transmitted to the CPU, another timer channel, a device internal to the MCU, etc.

A PWM unit includes at least one counter register that increments its counter value with each pulse of a clock signal. PWM units typically include comparators, compare registers and SR latches, which can be used to generate complementary, non-overlapping PWM output signals for controlling, for example, an external induction motor. A first comparator continuously compares the counter value with a first value generated by the CPU and stored in a first compare register. The first comparator asserts a signal when the counter value equals the first value. This signal resets an output of an SR latch. A second comparator continuously compares the counter value with a second value generated by the CPU and stored in a second compare register. The second value is typically zero. The second comparator asserts a signal when the counter value equals the second value. This signal sets the output of the SR latch. The combination of the second comparator and second compare register is part of device commonly known as a zero detector unit. Through a combination of setting and resetting the SR latch, the SR latch generates one of the two complimentary PWM signals (i.e., PWMA). Similar components can be used to generate the second of the two complimentary PWM signals (i.e., PWMB). A dead time is commonly inserted between PWMA and PWMB. The dead time is designed to prevent simultaneous assertion of both PWM signals, which can be problematic for devices to controlled by complementary, non-overlapping PWM signals. For purposes of explanation only, the remaining description will be described with reference to timer channels that include PWM units. Moreover, the remaining description will be described with reference to PWM units for generating complementary, non-overlapping PWM signals for use in controlling external devices like induction motors, voltage regulators, etc. The present embodiments should not be limited thereto.

Timer channels, when operating properly, generate complementary, non-overlapping PWM control signals. Timer channels can malfunction. For example, a timer channel may erroneously generate complementary, overlapping or partially overlapping PWM signals. A timer channel malfunction may be rooted in a hardware or software problem. With respect to the later, timer channels operate according to control values generated by the CPU. Errors in the embedded program can result in the CPU generating erroneous control values, which leads to timer channel misconfiguration and malfunction. Timer channel malfunction can cause damage to external devices. Timer channels units should be disabled if they malfunction.

External devices can fail due to faulty operating conditions (i.e., faults). For example an electric motor can fail if it is overloaded, overheated, driven with current that exceeds capabilities, etc. Most devices assert an error signal when a fault occurs. Timer channels controlling an external device should be disabled if the external device asserts an error signal or other signal indicating faulty operation.

A CPU can monitor timer channels and external devices for proper operation. The CPU can disable a timer channel if the CPU receives an error signal indicating timer channel malfunction or external device fault. The CPU, however, must process the error signal in accordance with its' embedded program in order to generate and transmit a disable signal to timer channels. There is a delay between the time an external device or timer channel asserts an error signal and the time the CPU disables the timer channel(s) controlling the external device. If the time delay is too long, damage to the external device may result.

The time delay between generation of an error signal and disablement of a timer channel(s) can be reduced through use of a dedicated, autonomously acting protection unit. This unit can generate a disable signal in response to receiving an error signal indicating timer channel error or external device fault. More particularly, MCUs may include a timer group output disable (TGOD) unit that continuously monitors a group of timer channels and an external device that is controlled by the group. If the TGOD unit receives an assertion of an error signal from a timer channel within the group, or if the TGOD receives an assertion of an error signal from the external device, the TGOD unit asserts a signal, which disables the outputs of the timer channels. Because the TGOD unit operates autonomously, timer channels can be disabled quickly, thereby reducing the risk of damage to an external device they control.

Figure 1:
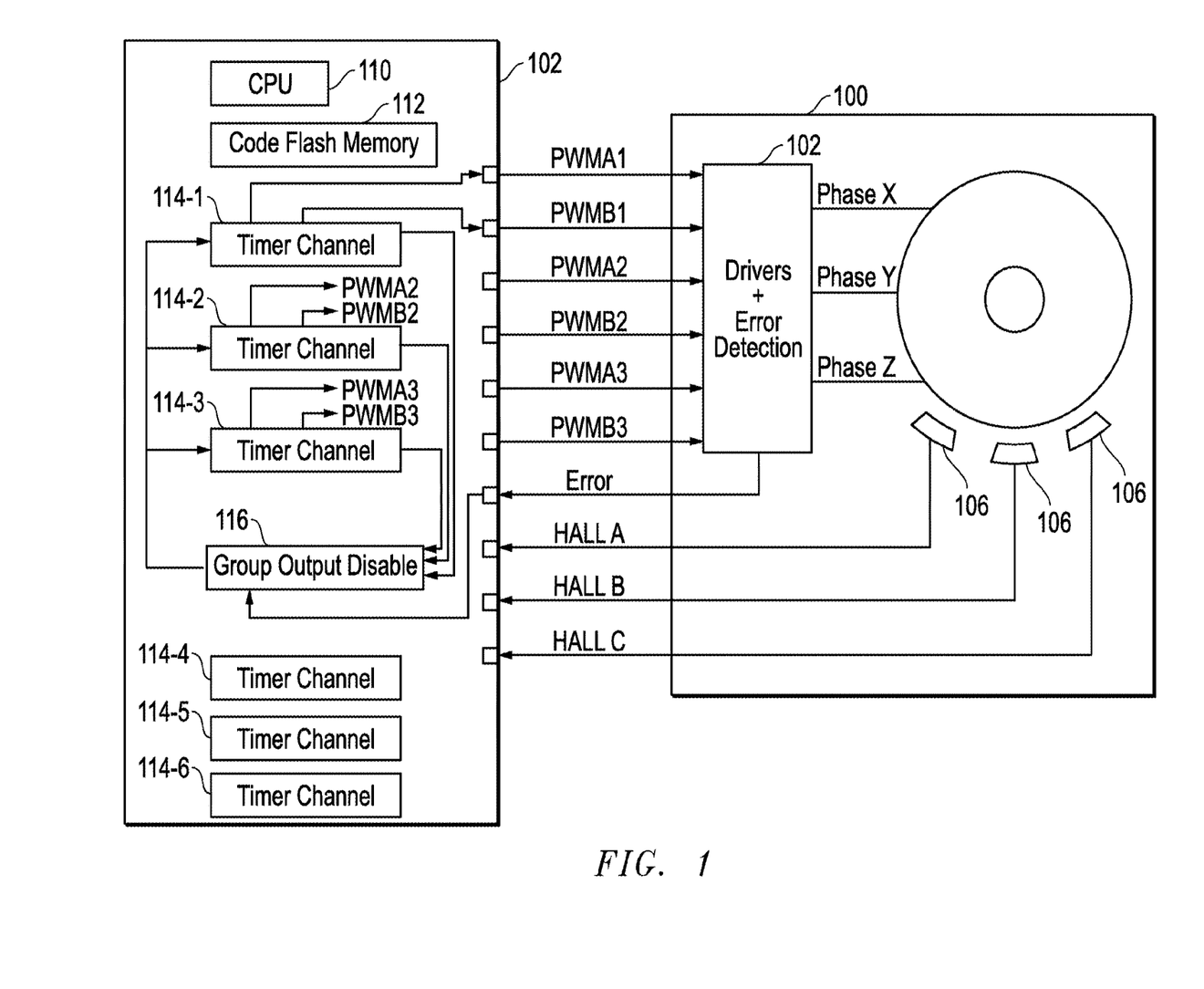
FIG. 1 is a block diagram illustrating an example MCU and induction motor.

TGOD units are static or hard wired to monitor specific groups of timer channels. As such, a TGOD unit can only disable the group of timer channels to which it is hard wired when one of them asserts an error signal. This makes the TGOD unit, and the MCU containing the TGOD, inflexible. To more fully illustrate the problem, FIG. 1 illustrates an example three-phase, brushless direct current induction motor (hereinafter motor) 100 controlled by an MCU 102. Although not shown, motor 100 includes a stator and a rotor. The stator includes three induction coil windings. Current flow through the windings is controlled by circuit 104. In particular, circuit 104 includes three drivers for driving respective winding coils with current. The three drivers operate in accordance with complementary, non-overlapping PWM signals generated by respective timer channels of MCU 102. Circuit 104 also asserts an error signal if, for example, motor 100 is overloaded, overheated, etc. FIG. 1 also shows hall sensors 106 within motor 100. These sensors 106 can detect a magnetic field of certain strength, and provide corresponding signals to MCU 102. These signals may be processed by the MCU 102 to also detect malfunction of motor 100.

MCU 102 includes CPU 110, which executes an embedded program within memory 112. MCU 102 also include timer channels 114 and TGOD 116. Timer channels 114-1 through 114-3 are identical to each other and include PWM units (not shown) for generating complementary PWM control signals. Each of the timer channels 114-1 through 114-3 also contains an error module that can assert an error signal when a timer channel malfunction is detected. For example the error module can assert an error signal if the dead time between the complementary PWM signals violates a preset condition, or if complimentary PWM signals are asserted high at the same time.

Timer channels 114-1 through 114-3 generate a set of three PWM signals (i.e., PWNIA1, PWMB1; PWMA2, PWMB2; and PWMA3, PWMB3), which control the motor 100 via circuit 102. MCU also includes timer channels 114-4 through 114-6, which have PWM units that can also generate complementary PWM control signals. Timer channels 114-4 through 114-6 may or may not have an error module like that mentioned above. Unfortunately, timer channels 114-4 through 114-6 are not connected to and as a result, cannot be monitored by TGOD 116 or any other TGOD in MCU 102.

TGOD unit 116 receives error signals from by timer channels 114-1 through 114-3. 'MOD unit 116 also receives the error signal from circuit 104 via an 1/0 pin of MCU 102. TGOD unit 116 monitors timer channels 114-1 through 114-3 and motor 100 via the received error signals. The TGOD unit 116 disables the three timer channels in response to an assertion of an error signal from any one of three timer channels or motor 100. More particularly, in response to receiving an assertion of any one of the error signals, TGOD unit 116 asserts a signal that disables timer channels 114-1 through 114-3. Accordingly, TGOD 116 serves to protect motor 100 when motor 100 faults or any of the timer channels 114-1 through 114-3 malfunction. Importantly, the disable signal is asserted independently of CPU 102. In this way, if motor 100 starts to overheat, or if timer channels 114-1 through 114-3 erroneously generates complementary, overlapping PWM signals, TGOD 116 can quickly disable timer channels 114-1 through 114-3 and prevent damage to motor 100. TGOD 116 also frees the CPU to perform duties other than monitoring timer channels 114-1 through 114-3 and motor 100.

Timer channels 114-4 through 114-6 could be used to generate the PWM signals that are needed to control motor 100. However, timer channels 114-4 through 114-6 cannot be monitored by TGOD unit 116 or another TGOD unit. In other words, no TGOD unit is available to disable timer channels 114-4 through 114-6 if one of them malfunctions. As a result, timer channels 114-4 through 114-6 are generally not used to control motor 100. And while timer channels 114-1 through 114-3 can be used to control a three phase induction motor, these timer channels may not be suitable for controlling devices that require, for example, a set of two PWM control signals or a set of four or more PWM control signals.

The problems described above and others can be solved by an MCU that includes programmable timer channels and one or more programmable timer group output disable (PTGOD) units. The present embodiments will be described with reference to an MCU that includes at least two PTGOD units, it being understood the present embodiments should not be limited thereto.

The programmable timer channels can he arbitrarily grouped together for controlling a device external to the MCI J. The number of programmable timer channels in a group is arbitrary and limited only to the programmable timer channels available on the MCI J. The number of programmable timer channel groups that can be created is arbitrary, each containing the same or a different number of programmable timer channels. For example, four programmable timer channels can grouped together for controlling a four-phase stepper motor, while three other programmable timer channels can be concurrently grouped for controlling a three-phase, brushless direct current induction motor. The CPU of the MCU selects programmable timer channels for inclusion in a group in accordance with instructions of an embedded program. A PTGOD unit can be arbitrarily assigned to a group of programmable timer channels. The CPU assigns a PTGOD unit to a group in accordance with instructions of the embedded program.

A PTGOD unit can receive one or more error signals from each programmable timer channel of the group to which the PTGOD unit is assigned. The PTGOD unit can also receive an error signal from: a device external to the MCU; one or more comparators or other peripheral of the MCU, and; a device that detects malfunction of clock. A PTGOD unit can assert its disable signal based on the assertion of any one or more of the error signals it receives. The CPU selects the one or more error signals upon which the PTGOD unit bases its disable signal in accordance with instructions of an embedded program. Each programmable timer channel in a group disables one or more of its output control signals in response to an assertion of a disable signal by the group's assigned PTGOD unit. These aspects and others will be described with reference to FIGS. 2-5, it being understood the present embodiments should not be limited thereto.

Figure 2:
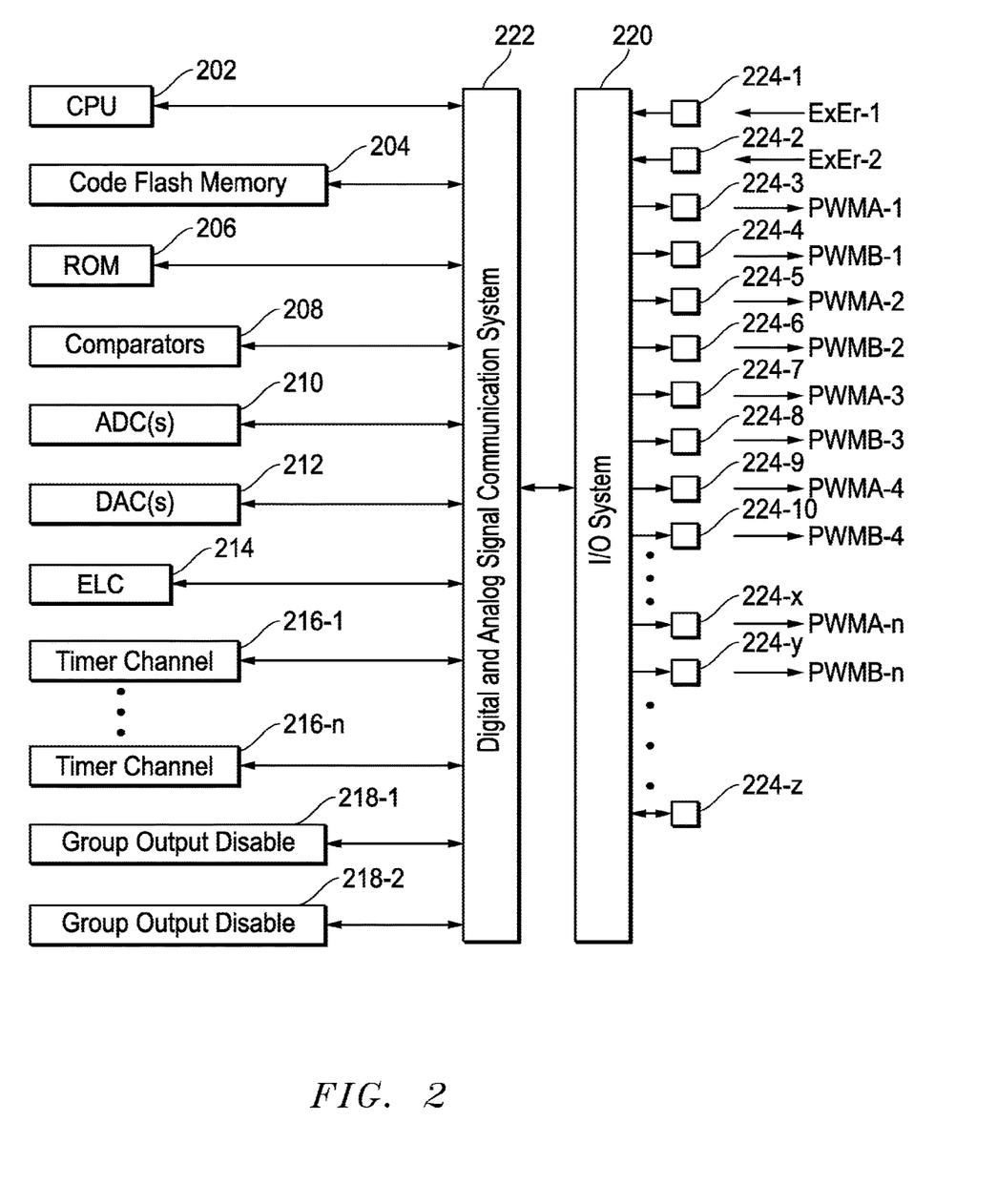
FIG. 2 is a block diagram illustrating an example MCU employing one embodiment.

FIG. 2 illustrates an example MCU 200 employing one embodiment of the present embodiments. MCU 200 includes a CPU 202 that contains an arithmetic logic unit, which performs arithmetic and logical operations, and a control unit which extracts instructions of an embedded program stored in flash memory 204, calling on the arithmetic logic unit when necessary. Although not shown in the figures, a computer system can transmit the embedded program, which takes form in executable instructions, via a communication link to MCU 200 for subsequent storage in flash memory 204. CPU 202 executes the embedded program and, in response, generates control values for controlling peripherals including programmable timer channels and PTGOD units that are more fully described below. MCLT 200 includes a small amount of RAM 206 that is used by CPU 202 for storing temporary data.

MCU 200 includes peripherals that cooperate with each other and CPU 202 to enhance the performance of MCU 200. Several of the peripherals can be programmed by CPU 202 to perform their respective functions autonomously. CPU 202, memory 204, RAM 206, and the peripherals are in data communication with each other via communication system 222. Although not shown, communication system 222 may take form in one or more buses, signal lines, and other devices that can transmit control values, signals (e.g., comparator output signals, disable signals, error signals, analog signals, etc.), addresses, data, instructions, etc.

MCU 200 includes one or more comparators 208, each of which can be programmed by CPU 202 to assert its output signal when the comparator determines two input digital values are equal. Comparator output signals can be transmitted to PTGOD units as error signals. CPU 202 is built to interpret and process digital data, and accordingly it is not able to do anything with analog signals received from, for example, devices external to MCU 200. Analog-to-digital converters (ADCs) 210 can convert analog signals into a form that CPU 202 or digital comparators 208 can recognize. For example, one of the ADCs 210 can convert MCU 200 also includes digital-to-analog converters (DACs) 212, which allow MCU 200 to output analog signals for controlling devices external to the MCU.

I/O system 220 contains I/O pins 224, some of which can be configured by CPU 202 to an input state or an output state. When I/O pins are in the input state, they are often used to receive signals generated by devices external to the MCU 100. An I/O pin 224 configured in the input state will he referred to herein as an input pin 224. When in the output state, I/O pins can be used to drive devices external to the MCU 200. An I/O pin 224 configured in the output state will be referred to herein as an output pin 224. With continuing with reference to FIG. 2, MCU 200 is shown I/O pins 224-1 an 224-2 configured as input pins to receive error signals ExEr-1 and ExEr-2 from external devices. Additional I/O pins 224 can be configured to receive error signals. As more will be fully described down below, error signals received at input pins 224-1 and 224-2 can be used to disable programmable timer channels.

With continuing reference to FIG. 2, MCU 200 includes an event link controller (ELC) 214, which can receive signals from 1/0 pins 224 such as 1/0 pins 224-1 or 224-2 via communication system 222. ELC 114 can also receive signals from peripherals such as comparators 208, ADCs 210, programmable timer channels 216, etc., via communication system 222. ELC 114 can be programmed by CPU 202 to distribute the signals it receives to peripherals via communication system 222. For example, ELC 214 can be configured to transmit: output signals of comparators 208 to PTGOD units; disable signals from PTGOD units to programmable timer channels; error signals from programmable timer channels to PTGOD units, etc.

MCU 200 includes programmable timer channels 216 and PTGOD units 218. Programmable timer channels 216 can be organized by CPU 202 into groups of one or more. PTGODs 218 can be programmed by CPU 202 to disable outputs of any group of timer channels 216.

Figure 3:
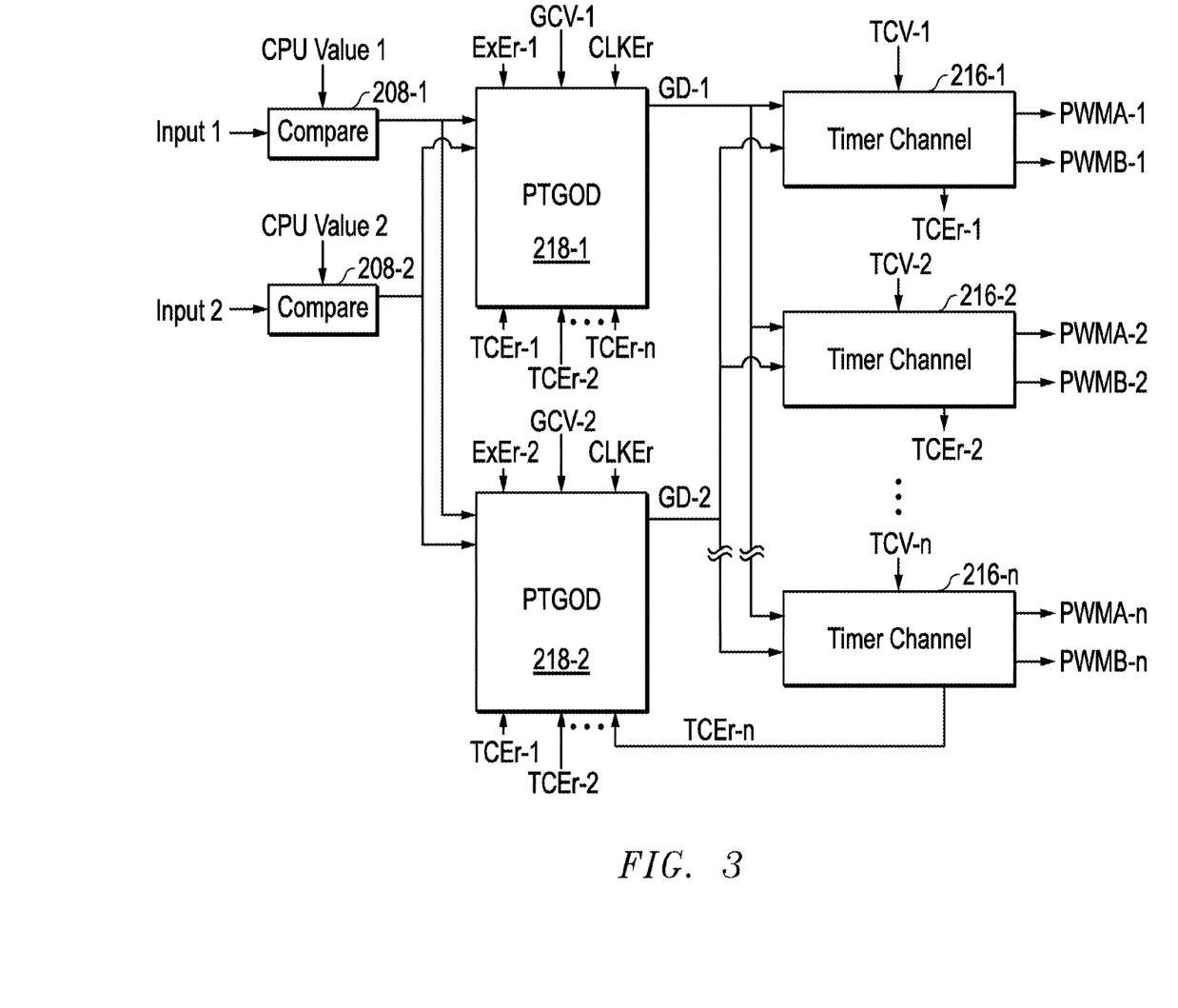
FIG. 3 is block diagrams illustrating example timer channels and channel group output disable units employed in the MCU of FIG. 2.

FIG. 3 illustrates the PTGOD units 218, programmable timer channels 216, and comparators 208 of FIG. 2 in data communication with each other. The present embodiments will be described with reference to two PTGOD units, it being understood alternative embodiments can employ more than two PTGOD units.

Each PTGOD unit 218-x receives an error signal TCEr from each of the timer channels 216. Each timer channel 216-x asserts its error signal TCEr-x if it malfunctions. In addition to receiving error signals TCEr, each PTGOD unit 218-x receives output signals from comparators 208. For purposes of explanation only, the output signal of a comparator 208-x will he referred to as comparator error signal CEr-x. PTGOD units 218 receive respective error signals from devices external to MCU 200. PTGOD unit 218-1 receives error signal ExEr-1 from a device (e.g., a four-phase stepper motor) via input pin 224-1, and PTGOD unit 218-2 receives an external error signal ExEr-2 from another device (e.g., a three phase brushless direct current induction motor like that shown in FIG. 1) via input pin 224-2. Both PTGOD units 218 also receive a clock error detection signal ClkEr from a clock monitor circuit (not shown). When asserted ClkEr indicates an error with the clock signal provided to, for example, programmable timer channels 216. For example, if a malfunction occurs in the oscillator or clock generator such that no clock signal is generated, the clock monitor circuit asserts ClkEr.

Each PTGOD unit 218-x is programmed via a control value GCV-x generated by CPU 202 in accordance with instructions of the embedded program in memory 204. The control values GCV are stored in registers of PTGOD units 218 and may be updated by CPU 202 during runtime. Each PTGOD unit 218-x can assert a disable signal GD-x in response to an assertion of any one or more of the error signals TCEr-1 through TCEr-n, ExEr-x, ClkEr, CEr-1, or CEr-2. In other words, PTGOD unit 218-x generates its disable signal GD-x as a function of one or more of the error signals. As will be more fully described below, GCV-x defines which of the error signals TCEr-1 through TCEr-n, ExEr-x, ClkEr, CEr-1, or CEr-2 are used by PTGOD unit 218-x to trigger assertion of GD-x. The disable signal GD-x, when asserted, can disable one or more output signals of a group of timer channels 216 to which PTGOD unit 218-x is assigned.

Timer channels 216 may be structurally distinct from each other. For purposes of explanation only, each of the timer channels 216 includes a PWM unit like that described above. Timer channels 216 generate output signals for controlling internal or external devices. For example, properly operating PWM units of timer channels 216 generate complementary, non-overlapping PWM signals PWMA and PWMB, which in turn can be used to control devices external to the MCU. The present embodiments will be described with respect to PTGOD units 218 that can disable the generation of the PWM signals, it being understood the PTGOD units 218 can disable additional output signals of timer channels 216.

Each timer channel 216-x asserts its error signal TCEr-x in response to detecting a malfunction. In one embodiment timer channel error signals can he selectively transmitted to PTGOD units 218. For purposes of explanation, however, each timer channel 216-x transmits its error signal TCEr-x to each of the PTGOD units 218. Timer channels 216 also a receive group disable signal GD from each of the PTGOD units 218. Control values generated by the CPU are used by the programmable timer channels to determine which, if any, of the disable signals are to be used for disabling outputs.

Timer channels 216 receive and store control values TCV generated by CPU 202 during runtime. CPU 202 can update the control values in response to executing instructions of the embedded program in memory 204. One or more output signals of a timer channel 216-x can be disabled in response to an assertion of a group disable signal GD-1 or GD-2, depending on the value of TCV-x. In other words, timer channels 216 selectively respond to one of the two group disable signals GD-1 or GD-2 generated by PTGOD unit 218-1 and 218-2, respectively, based upon a control value TCV. Ultimately, timer channel 216-x will disable one or more output signals (e.g., PWMA-x and/or PWMB-x) when a group disable signal GD selected for the timer channel, is asserted.

Figure 4:
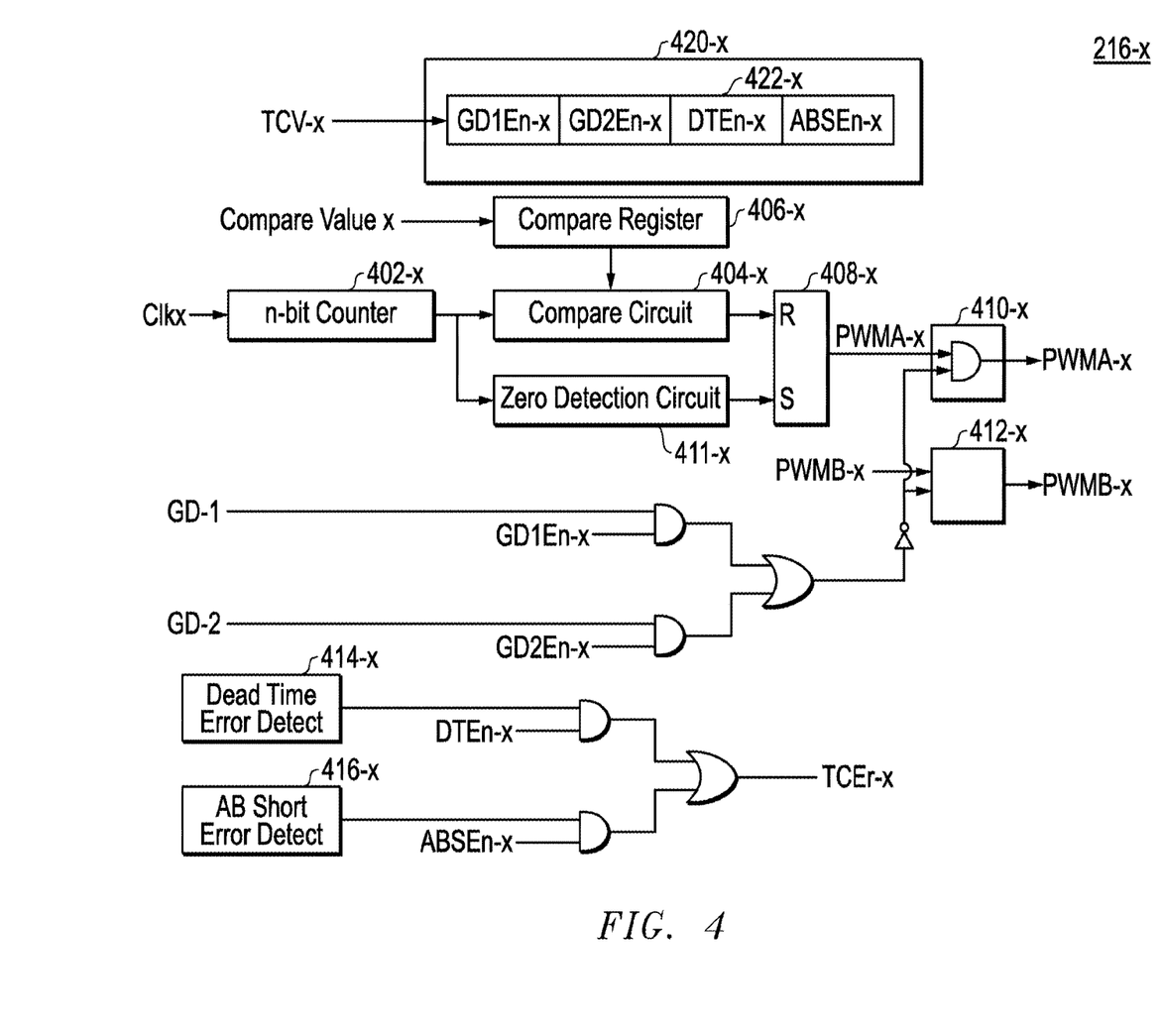
FIG. 4 is a block diagram of an example timer channel that could be employed in MCU of FIG. 2.

FIG. 4 illustrates several components of an example timer channel 216-x. As noted above, each of the timer channels 216 is presumed to include a PWM unit. FIG. 4 shows several components of a PWM unit. More particularly, FIG. 4 shows a counter register 402-x that has an n-bit counter value, which is incremented with each pulse of the clock signal Clk-x. As shown in FIG. 4, a compare circuit 404-x compares the counter value with a compare value generated by CPU 202 and stored in register 406-x. If compare circuit 404-x detects the counter value equates to the compare value, compare circuit 404 asserts its output, which is coupled to the R port of SR latch 408-x. Timer channel 216-x also includes a zero detection circuit 411-x, which asserts its output whenever counter 402-x overflows to zero. The output of zero detection circuit 411-x is provided to the S port of SR latch 408-x. The output of SR latch 408-x is provided to output control circuit 410-x as PWMA-x, one of two complimentary PWM signals. Additional circuitry (not shown) generates PWMB-x, the second of the two complimentary PWM signals, which in turn is provided to output control circuit 412-x. Additional output logic is provided for other output signals generated by timer channel 216-x Timer channel 216-x includes a dead time error detect circuit 414-x and an AB short detect circuit 416-x. Dead time error detect circuit 414-x asserts an error signal when the dead time between complimentary signals PWMA-x and PWMB-x is less than a minimum amount of time. AB short detect circuit 416-x asserts an error signal when the outputs of control circuits 410-x and 412-x are simultaneously asserted. Programmable timer channel error signal TCEr-x is transmitted to each of the PTGOD units 218

Timer channel 216-x includes control registers 420-x, which includes group output control register 422-x. This control register stores timer control value TCV-x generated by CPU 202. It is noted that in the embodiment shown, TCV-x includes four bits, it being understood that the present embodiments should not be limited thereto. The bits of TCV-x are used to configure logic within timer channel 216-x. For example, with enable bits DTEn-x and ABSEn-x set to logical one, timer channel 216-x will transmit an error signal generated by detection circuits 414-x or 416-x to PTGOD unit 218-1 and PTGOD unit 218-2. Bits within register 422-x also determine which, if any, of the PTGOD units 218 are assigned to timer channel 216-x. For example, in one configuration the outputs of control circuits 410-x and 412-x will be disabled such that PWMA-x and PWMB-x will be driven low when, for example, GD1En-x is set to logical one and PTGOD unit 218-1 asserts group disable signal GD-1. At another point in time when a new control value TCV-x is written to register 422-x the outputs of control circuits 410-x and 412-x will be disabled such that PWMA-x and PWMB-x will be driven low when GD2En-x is set to logical one and group disable signal GD2 is asserted. As one of ordinary skill in the art understands, CPU 202 can overwrite an existing value TCV-x within register 422-x. This enables one element if flexibility that is not provided by MCU shown within FIG. 1.

Figure 5:
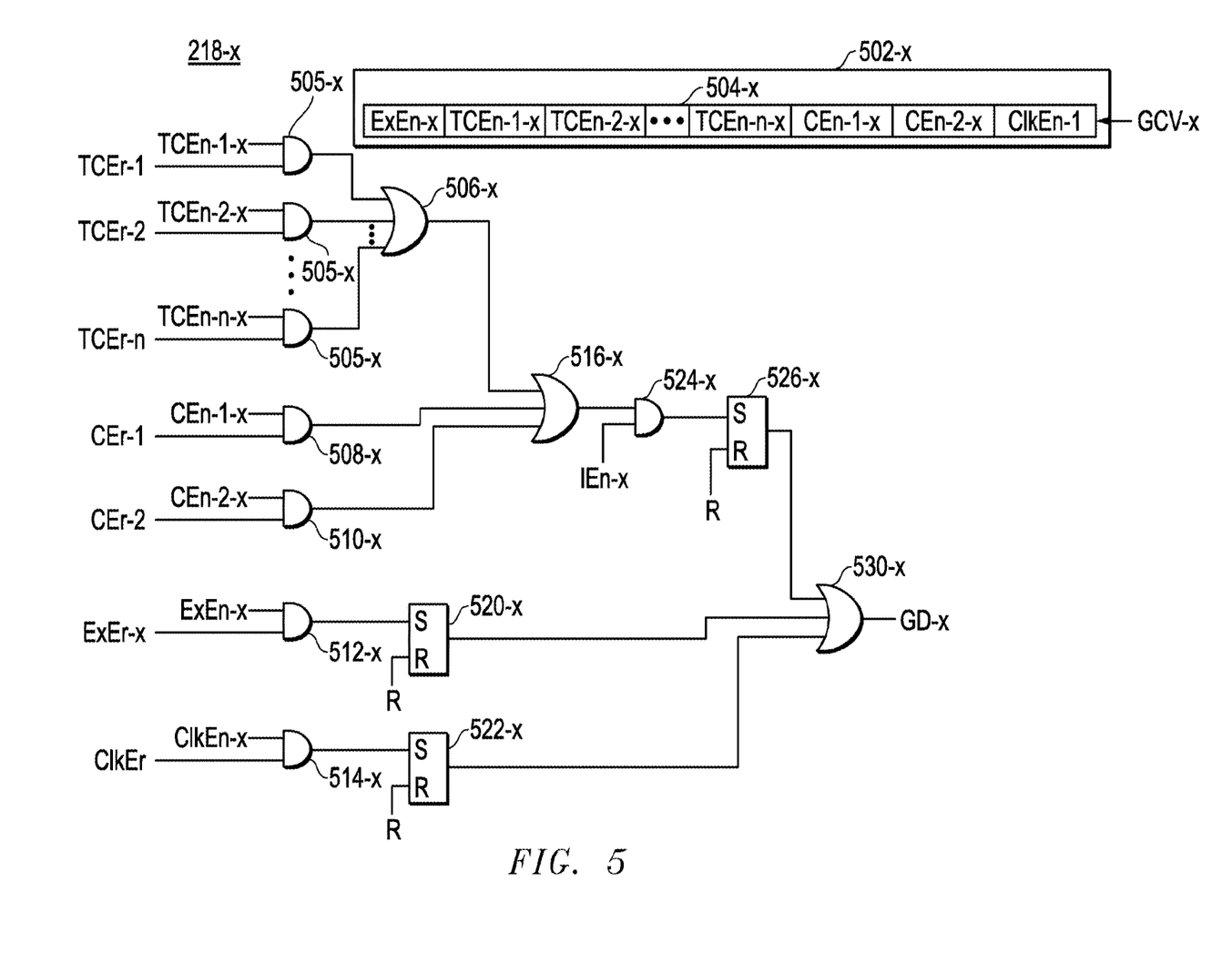
FIG. 5 is a block diagram of an example channel group output disable unit that could be employed in MCU of FIG. 2.

FIG. 5 is a schematic diagram of an example PTGOD unit 218-x that can be employed within MCU 200. PTGOD unit 218-x includes a set of control registers 502-x, including a configuration register 504-x that receives the multi-bit control value GCV-x generated by CPU 202. The contents of register 504-x can be updated by CPU 202 while it is executing the embedded program in memory.

PTGOD unit 218-x generates group disable signal GD-x according to control value GCV-x. PTGOD 21S-x receives: timer channel error signals TCEr-1-TCEr-n; comparator error signals CEr-1 and CEr-2; external error signal ExEr-x, and; clock error signal ClkEr. AND gates 505-y-x receive respective timer error signals TCEr from timer channels 216 as shown. Depending on the state of the enable bits TCEn of GCV-x, AND gates 505-y-x pass the error signals they receive to OR gate 506-x, the output of which is provided as an input to OR gate 516-x. PTGOD unit 218-x includes AND gates 508-x and 510-x that pass comparator error signals CEr-1 and CEr-2, respectively, to OR gate 516-x if enable bits CEn-1 and CEn-2, respectively, of GCV-x are set to logical one. AND gates 512-x and 514-x pass the externally generated error signal ExEr-x and the clock error signal ClkEr, respectively, to OR gate 516-x if enable bits ExEn-x and ClkEn-x, respectively, are set to logical one.

The output of OR gate 516-x is passed to the S port of SR latch 526-x via AND gate 524-x if enable bit IEn-x is set to logical one. The output of AND gates 512-x and 514-x are passed to the S ports of SR latches 520-x and 522-x, respectively, if enable bits ExEn-x and ClkEn-x, respectively, are set to logical one. The outputs of the three SR latches are input to OR gate 530-x, the output of which generates group disable signal GD-x. One of ordinary skill will understand that each SR latch asserts its output signal when the signal at the S port is asserted. And the output of each SR latch will remain asserted until the SR latch is reset by signal R. CPU 202 can assert signal R directly or indirectly. Thus, disable signal GD-x will be asserted if, for example, TCEr-2 is asserted while enable bit TCEn-2 is set to logical one, and GD-x will remain asserted until SR latch 526-x is reset.

CPU 202 can select any group of one or more timer channels 216 to be monitored by PTGOD unit 218-1 or 218-2. For example, it may be desirable to control a three-phase induction motor using PWM signals generated by timer channels 216-2, 216-4, and 216-8. That configuration can be enabled by CPU 202 generating control values TCV-2, TCV-4, and TCV-8 with enable bits GD1En-2, GD1En-4, and GD1En-8, respectively, set to logical one. At the same time, CPU 202 can assign PTGOD unit 218-1 to the group that includes timer channels 216-2, 216-4, and 216-8. This configuration can be enabled with control value GCV-1 having enable bits TCEn-1-2, TCEn-1-4, and TCEn-1-8 set to logical one. In addition, enable bits ExEn-1 and ClkEn-1 of GCV-1 can be set to logical one. In this configuration, PTGOD unit 218-1 will disable the PWM signals generated by timer channels 216-2, 216-4, and 216-8 if any of the error signals TCEr-2, TCEr-4, TCEr-8, EXEr-1, or ClkEr is asserted.

Figure 6A:
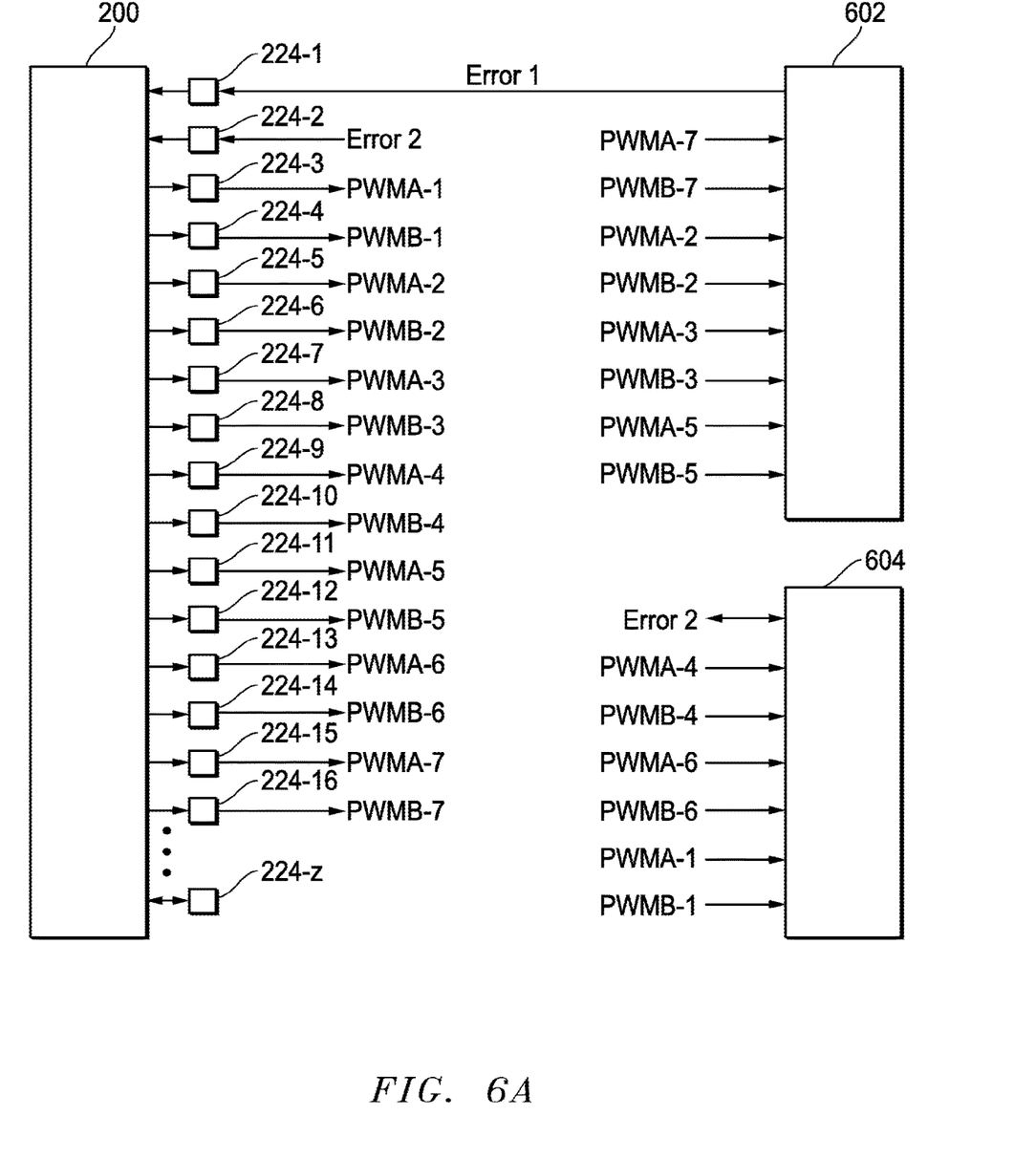
FIGS. 6a and 6b illustrate aspects of the flexibility provided by the MCIJ of FIG. 2.
Figure 6B:
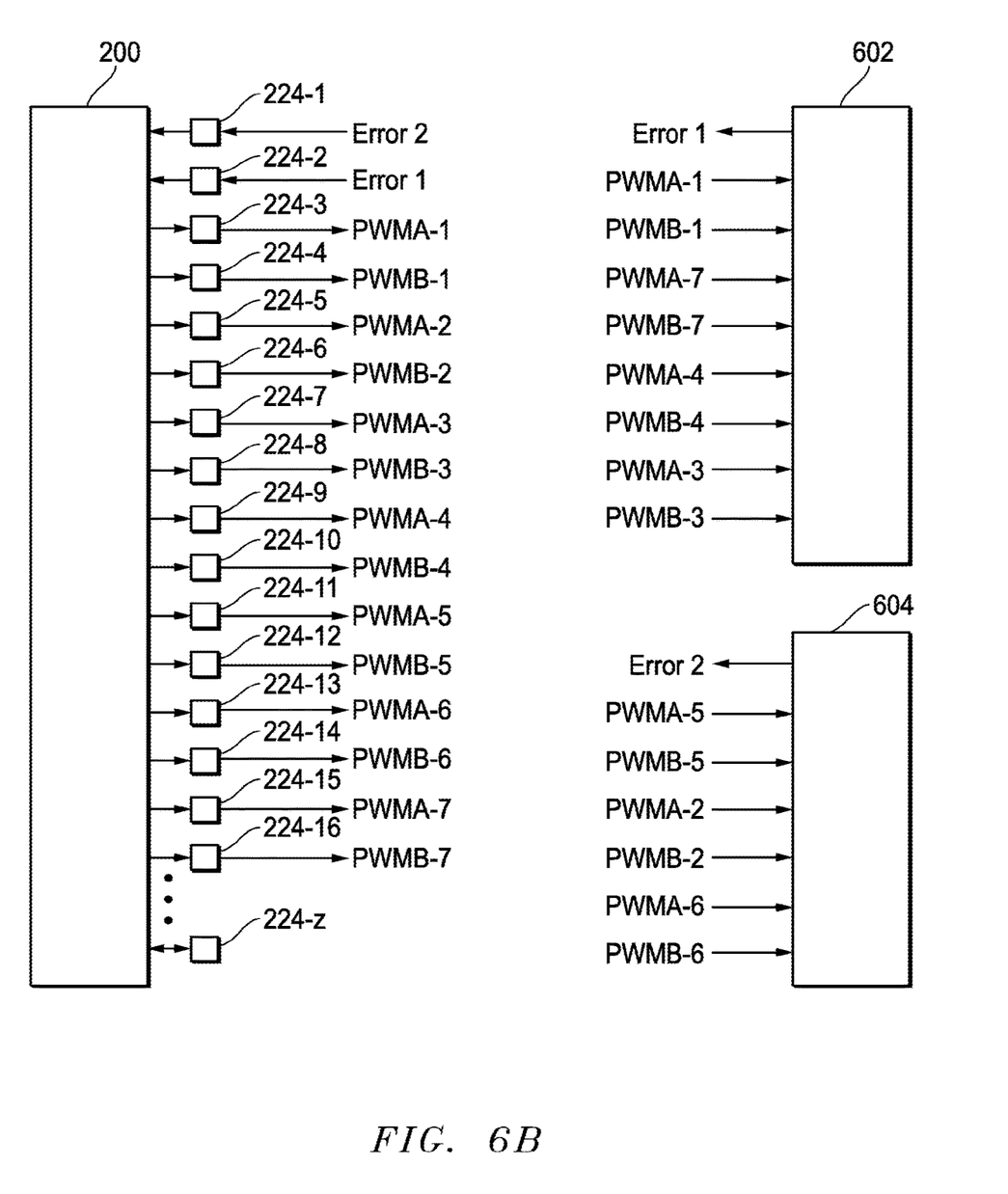

Timer channels 216 and PTGOD units 218 enable flexibility in the types and number of external devices that can be controlled by MCU 200. FIGS. 6a and 6b illustrate aspects of the flexibility provided by MCU 200. In these figures, a four-phase stepper motor 602 and a three-phase induction motor 604 are concurrently controlled by MCU 200. Inputs to motors 602 and 604 are wired to I/O pins 224 of MCU, thereby facilitating the transfer of PWM signals and error signals as shown.

With continuing reference to FIGS. 2-5, CPU 202 in FIG. 6a assigns PTGOD unit 218-1 to the group of timer channels 216-2, 216-3, 216-5, and 216-7, which in turn are configured to generate non-overlapping PWM signals as shown for controlling motor 602. PTGOD unit 218-1 receives error signal Errorl from motor 602. CPU 202 configures PTGOD unit 218-1 to disable its' assigned group of timer channels when, for example, error signal Errorl, CEr-1, or ClkEr is asserted. PTGOD unit 218-1 in this configuration ignores error signals TCEr-2, TCEr-3, TCEr-5 and TCEr-7. In similar fashion, CPU 202 concurrently assigns PTGOD unit 218-2 to the group of timer channels 216-1, 216-4, and 216-6, which in turn are configured to generate non-overlapping PWM signals for controlling motor 604. PTGOD unit 218-2 receives error signal Error2 from motor 604. CPU 202 configures PTGOD unit 218-2 to disable its' assigned group of timer channels when, for example, error signal TCEr-1, TCEr-4, or TCEr-6 is asserted. PTGOD unit 218-2 in this configuration ignores error signals Error2, CEr-1, CEr-2, and ClkEr.

FIG. 6b illustrates the same MCU 200 and motors 602 and 604 shown in FIG. 6a, but with different wiring (not shown) between motor control inputs and I/O pins 224. Additionally, CPU 202 configures the timer channels 216 and PTGOD units 218 differently. CPU 202 in FIG. 6b assigns PTGOD unit 218-1 to the group of timer channels 216-1, 216-3, 216-4, and 216-7, which in turn are configured to generate non-overlapping PWM signals as shown for controlling motor 602. PTGOD unit 218-2 receives error signal Errorl from motor 602. CPU 202 configures PTGOD unit 218-2 to disable its' assigned group of timer channels when, for example, error signal Error2, TCEr-1, TCEr-3, TCEr-4, or TCEr-7 is asserted. PTGOD unit 218-1 in this configuration ignores error signals CEr-1, CEr-2, and ClkEr. In similar fashion, CPU 202 concurrently assigns PTGOD unit 218-1 to the group of timer channels 216-2, 216-5, and 216-6, which in turn are configured to generate non-overlapping PWM signals for controlling motor 604. PTGOD unit 218-1 receives error signal Errorl from motor 602. CPU 202 configures PTGOD unit 218-1 to disable its' assigned group of timer channels when any of error signals Error2, TCEr-2, TCEr-5, TCEr-6, CEr-1, CEr-2, or ClkEr is asserted.

Compared to MCU 100 shown in FIG. 1 and described above, MCU 200 provides more flexibility in its ability to control external devices such as motors.

Although the present embodiments have been described in connection with several examples, the embodiments is not intended to be limited to the specific forms set forth herein. On the contrary, it is intended to cover such alternatives, modifications, and equivalents as can be reasonably included within the scope of the embodiments as defined by the appended claims.

What is claimed is:
1. A method implemented in a microcontroller unit (MCU) that comprises a central processing unit (CPU) coupled to a plurality of timer channels having respective control registers and a plurality of disable circuits, the method comprising:

configuring, by the CPU, a first group of the plurality of timer channels by writing first timer control values to the respective control registers of the timer channels of the first group;

asserting, by a first of the disable circuits, a first output disable signal to the first group; and using, by each timer channel of the first group, the first timer control value that has been programmed into its respective control register by the CPU to determine whether to output or prevent output of a respective output signal.

2. The method of claim 1 further comprising the CPU programming the first disable circuit by writing a first disable control value to a control register of the first disable circuit, wherein the first disable circuit, after it is programmed, asserts the first output disable signal in response to an assertion of an error signal by one timer channel in the first group.

3. The method of claim 2 further comprising the CPU programming a second group of the timer channels by writing second timer control values to respective control registers of the timer channels of the second group, wherein each timer channel of the second group, after it is programmed, will be disabled in response to an assertion of a second output disable signal by a second of the disable circuits, wherein the one timer channel of the first group is not contained in the second group, and wherein at least one timer channel of the second group is not contained in the first group.

4. The method of claim 3 further comprising the CPU programming the second disable circuit by writing a second disable control value to a control register of the second disable circuit, wherein the second disable circuit, after it is programmed, asserts the second output disable signal in response to an assertion of an error signal by the one timer channel in the second group.

5. The method of claim 4 wherein the CPU programs the first and second disable circuits, and programs the first and second groups of timer channels in response to executing instructions stored in memory of the MCU.

6. The method of claim 5 wherein:
the first disable circuit, after it is programmed, asserts the first output disable signal in response to receiving an assertion of an error signal via a first input/output (I/O) pin of the MCU;
the second disable circuit, after it is programmed, asserts the second output disable signal in response to receiving an assertion of an error signal via a second I/O pin of the MCU.

7. The method of claim 5 wherein the MCU further comprises a plurality of comparator circuits, each of which is configured to compare digital values, and wherein:
the first disable circuit, after it is programmed, asserts the first output disable signal in response to an assertion of an error signal by a first comparator circuit of the comparator circuits;
the second disable circuit, after it is programmed, asserts the second disable signal in response to an assertion of an error signal by a second comparator circuit of the comparator circuits.

8. The method of claim 1 wherein the MCU further comprises a clock circuit for generating a clock signal, and wherein:
the first disable circuit, after it is programmed, asserts the first disable signal in response to an assertion of an error signal indicating failure of the clock circuit;

a second disable circuit, after it is configured, asserts a second disable signal in response to the assertion of the error signal indicating failure of the clock circuit.

9. A system comprising:
a microcontroller (MCU), wherein the MCU comprises:
a central processing unit (CPU);
a plurality of timer channels, each timer channel including a respective control register; and
a plurality of disable circuits, wherein the CPU configures a first group of the timer channels by writing first timer control values to the respective control registers of the timer channels of the first group, and
wherein a first of the disable circuits is configured to assert a first output disable signal to the first group, and
wherein each timer channel of the first group is configured to use the first timer control value that has been programmed into its respective control register by the CPU to determine whether to output or prevent output of a respective output signal.

10. The system of claim 9 wherein the CPU is configured to program the first disable circuit by writing a first disable control value to control register of the first disable circuit, wherein the first disable circuit, after it is programmed, asserts the first output disable signal in response to an assertion of an error signal by one timer channel of the first group.

11. The system of claim 10 wherein the CPU is configured to program a second group of the timer channels by writing second timer control values to respective control registers of the timer channels of the second group, wherein each timer channel of the second group, after it is programmed, will be disabled in response to an assertion of a second output disable signal by a second of the disable circuits, wherein the one timer channel of the first group is not contained in the second group, and wherein at least one timer channel of the second group is not contained in the first group.

12. The system of claim 11 wherein the CPU is configured to program the second disable circuit by writing a second disable control value to control register of the second disable circuit, wherein the second disable circuit, after it is programmed, asserts the second output disable signal in response to an assertion of an error signal by the one timer channel in the second group.

13. The system of claim 12 wherein the MCU comprises memory for storing instructions, wherein the CPU programs the first and second disable circuits in response to the executing instructions, and wherein the CPU programs the first and second groups of timer channels in response to the executing instructions.

14. The system of claim 12 wherein:
the first disable circuit, after it is programmed, is configured to assert the first output disable signal in response to receiving an assertion of an error signal via a first input/output (I/O) pin of the MCU;
the second disable circuit, after it is programmed, is configured to assert the second output disable signal in response to receiving an assertion of an error signal via a second I/O pin of the MCU.

15. The system of claim 12 wherein the MCU further comprises:
a plurality of comparator circuits, each of which is configured to compare digital values;
wherein the first disable circuit, after it is programmed, is configured to assert the first output disable signal in response to an assertion of a signal by a first of the comparator circuits;

wherein the second disable circuit, after it is programmed, is configured to assert the second disable signal in response to an assertion of a signal by a second the comparator circuits.

16. The system of claim 12;

wherein the MCU further comprises a clock circuit for generating a clock signal;

wherein the first disable circuit, after it is programmed, is configured to assert the first disable signal in response to an assertion of an error signal indicating failure of the clock circuit;

wherein the second disable circuit, after it is programmed, is configured to assert the second disable signal in response to the assertion of the error signal indicating failure of the clock circuit.

17. A microcontroller comprising:

a plurality of timer channels, each timer channel including a respective control register;

a plurality of disable circuits; and a memory comprising an embedded program, the embedded program, when executed by a CPU of the microcontroller, causes the microcontroller to perform a method comprising:

configuring a first group of the timer channels by writing first timer control values to the respective control registers of the timer channels of the first group, wherein a first of the disable circuits is configured to assert a first output disable signal to the first group, and wherein each timer channel of the first group is configured to use the first timer control value that has been programmed into its respective control register by the CPU to determine whether to output or prevent output of a respective output signal.

18. The microcontroller of claim 17 wherein the method further comprises programming the first disable circuit by writing a first disable control value to control register of the first disable circuit, wherein the disable circuit, after it is programmed, asserts the first output disable signal in response to assertion of an error signal.

19. The microcontroller of claim 18 wherein the method further comprises programming a second group of the timer channels by writing second timer control values to respective control registers of the timer channels of the second group, wherein each timer channel of the second group, after it is programmed, will be disabled in response to an assertion of a second output disable signal by a second of the disable circuits, wherein the one timer channel of the first group is not contained in the second group, and wherein one timer channel of the second group is not contained in the first group.

20. The microcontroller of claim 19 wherein the method further comprises programming the second disable circuit by writing a second disable control value to a control register of the second disable circuit, wherein the second disable circuit, after it is programmed, asserts the second output disable signal in response to an assertion of an error signal by the one timer channel in the second group.

* * * * *